United States Patent
Griswold et al.

(10) Patent No.: US 6,206,043 B1
(45) Date of Patent: Mar. 27, 2001

(54) CAM OPERATED DIVERTER VALVE

(75) Inventors: Jay P. Griswold, St. Charles, IL (US); Robert A. Livernash, Gravois Mills, MO (US); Wesley A. Swanson, Elk Grove Village, IL (US)

(73) Assignee: Ranco Incorporated of Delaware, Wilmington, DE (US)

( * ) Notice: Subject to any disclaimer, the term of this patent is extended or adjusted under 35 U.S.C. 154(b) by 0 days.

(21) Appl. No.: 09/435,577

(22) Filed: Nov. 8, 1999

(51) Int. Cl.[7] .................................................. F16K 31/52
(52) U.S. Cl. ............................... 137/625.44; 251/129.12; 251/251
(58) Field of Search ............................... 137/625.44, 875; 251/129.12, 251

(56) References Cited

U.S. PATENT DOCUMENTS

| | | | |
|---|---|---|---|
| 2,395,747 | * | 2/1946 | Loeb ..................................... 251/251 |
| 2,665,088 | * | 1/1954 | Lobelle ................................. 251/251 |
| 4,312,378 | * | 1/1982 | Dollison .......................... 137/625.44 |
| 4,398,562 | * | 8/1983 | Saarem et al. .................. 137/625.47 |

FOREIGN PATENT DOCUMENTS

2124122 * 4/1972 (DE) ................................ 137/625.44

* cited by examiner

Primary Examiner—John Fox
(74) Attorney, Agent, or Firm—Leydig, Voit & Mayer, Ltd.

(57) ABSTRACT

A diverter valve comprises a body defining a first, a second, and a third orifice, a flipper operably positioned to substantially prohibit flow through one of the first, the second, and the third orifices, and a flipper drive mechanism drivably coupled to the flipper. The flipper drive mechanism comprises a motor, a cam drivably coupled to the motor and including a cam position indicator, a follower drivably coupled to the cam translating rotational motion of the cam into reciprocal motion to drive the flipper, and a motor control circuit in sensory communication with the cam position indicator. The motor control circuit couples an external source of electrical power to the motor to energize the motor to drive the cam to a first and a second predetermined position. The motor control circuit includes a first controllable switch in series with a first position switch. This first position switch opens in response to the cam position indicator indicating that the cam is at the first predetermined position. The motor control circuit further includes a second controllable switch in series with a second position switch and in parallel to the first controllable switch and the first position switch. This the second position switch opens in response to the cam position indicator indicating that the cam is at the second predetermined position.

14 Claims, 4 Drawing Sheets

CAM OPERATED DIVERTER VALVE

FIELD OF THE INVENTION

The instant invention is directed generally to the field of diverter valves, and more particularly to drive mechanisms for diverter valves.

BACKGROUND OF THE INVENTION

Controllable valves for channeling or diverting a flow of fluid from one channel to another are used in many fluid flow control applications. One such application is in the field of consumer home appliances, and more particularly in modern, high efficiency washing machines. Conventional consumer washing machines utilize tremendous amounts of water during the wash and rinse cycle because all water utilized in these cycles was directly dumped overboard by a simple drain valve. However, advances in the washing machine technology and concern for conservation of natural resources has resulted in the incorporation of a controllable diverter valve in place of this simple drain valve in these new, high efficiency washing machines.

In such a machine, a solenoid actuated diverter valve is utilized to redirect the flow of water being siphoned from the washing drum so that it may be recirculated to the washing drum for a period during a particular cycle. Once this cycle of recirculation is complete, the solenoid actuated diverter valve is operated to divert or redirect the flow of water from the recirculation circuit to the drain circuit so that the water may be dumped overboard, typically to a standpipe. Such recirculation may be accomplished in either or both the wash cycle and the rinse cycle to conserve the amount of water utilized in the washing process. In a typical application for a rinse cycle, the diverter valve will first be set to a recirculation position directing any water flowing therethrough back to the washer tub. The washing machine will then begin a spin cycle, spraying the clothes with fresh water. The water is pulled through the close by the centrifugal action of the spinning tub where it falls down to the sump and flows to the water pump inlet. The pump forces the water through the diverter valve to a siphon break where it is redistributed on the spinning clothes. This recirculation is allowed to continue for a period of time. Thereafter, the diverter valve solenoid is actuated to place the diverter valve in the drain position to discharge the rinse water to the standpipe. Once all of the water used in that portion of the rinse cycle has been discharged, the solenoid is again actuated to place the diverter valve in the recirculation position so that an additional cycle may begin with fresh water. In a typical application, this process is repeated several times to completed the rinse cycle. In this way superior performance may be achieved with a significantly reduced amount of water being used.

While this high efficiency recirculation method of washing and rinsing has been perfected, the performance of the solenoid actuated diverter valves themselves have not met with such success. Because these valves rely upon a solenoid to actuate the diverter valve flipper, the physical size of this solenoid actuated valve is significant. To hold this solenoid drive mechanism in place, a large metal bracket is required. Also because of the significant weight of the solenoid and bracket, the drain bucket onto which this bracket is mounted must be made of metal to support the weight of the solenoid and bracket assembly. This further increases the overall weight of the washing machine and increases the cost per machine. Because actuation of the solenoid pulls on its armature which is connected to a lever that is attached through a shaft to the flipper of the diverter valve, the actual operation of this solenoid actuated diverter valve is also quite noisy. This noise results from the sudden contact of the armature to the housing end wall when it is pulled into position by energization of the solenoid. This loud noise several times during the wash and rinse cycles reduces the customer appeal for these washing machines, therefore adversely impacting the sales of these machines. This despite the obvious advantage of the conservation of water provided by these machines.

An additional problem existing with the usage of these solenoid actuated diverter valves is that the spring reliability within the solenoid assembly is unacceptably low. Specifically, the reliability of the spring which returns the solenoid shaft to its quiescent position when the solenoid is deenergized, returning the diverter valve flipper back to its quiescent position, is too low. As described above, a typical single rinse cycle includes several operations of a solenoid actuated diverter valve. Additionally, a typical wash cycle includes at least two rinse cycles, each of which having several actuations of the diverter valve. Further, the newest high efficiency machines are utilizing this recirculation technique during the actual wash cycles, thereby increasing the number of actuations of the solenoid diverter valve several fold.

When the typical number of loads of laundry washed by a typical family over the projected lifetime of a washing machine is multiplied by the number of solenoid actuations of the diverter valve for each complete wash cycle, it will be recognized by one skilled in the art that the reliability of the solenoid diverter valve must be significant. Unfortunately, the reliability of the springs in the typical solenoids simply does not meet these requirements. While higher reliability materials may be used to construct these solenoid springs, the higher reliability provided results in a significantly increased cost beyond which is commercially feasible in the highly competitive consumer appliance industry.

Further, the use of a solenoid driven diverter valve introduces electrical inefficiencies which significantly lessens the environmental gains introduced by the water savings. Specifically, the typical solenoid driven diverter valve uses a held type solenoid which requires the flow of electrical current through the solenoid windings during the entire period that the diverter valve is to be in the diverted position. This continuous power flow increases the users cost of ownership through increased power draw, and further introduces an additional design consideration for the product designers. Specifically, the continuous current flow through the solenoid coils introduces a heat rise which must be compensated for in the overall system design. This heat rise may limit the available materials that may be utilized to house the solenoid and its associated circuitry, and may require separate cooling considerations and/or ventilation to be added to the machine.

It is therefore a desire in the industry to have a lightweight, quiet, highly reliable diverter valve actuation system which is relatively inexpensive and which is able to control an operating pressure nearly double the deadhead pump pressure of prior designs. It is such a system that is provided by the instant invention.

SUMMARY OF THE INVENTION

In view of the above problems existing in the art, it is an object of the instant invention to provide a new and improved drive mechanism for a flipper type diverter valve suitable for use in consumer home appliance applications.

More specifically, it is an object of the instant invention to provide new and improved flipper valve assembly that has a significantly reduced operating noise level. It is a further object of the instant invention to provide a new and improved drive and flipper valve apparatus having reduced weight, increased reliability, and reduced cost. Further, it is an object of the instant invention to provide a new and improved flipper valve apparatus able to control an increased operating pressure with a reduced power usage. Further, it is an object of the instant invention to provide a new and improved flipper valve apparatus that eliminates heat rise as a design consideration.

In view of these objects it is a feature of the instant invention to provide an integrated drive flipper valve apparatus which utilizes a motor drive cam to actuate the flipper valve between each of its respective positions. It is an additional feature of the instant invention to provide a motor controller that senses the position of the flipper valve to control the motor energization. It is an additional feature of the instant invention to provide as a feature of the flipper flexure so as to allow the motor to continue to either of its fully actuated positions without stalling if an object were to impede the movement of the flipper. It is an additional feature of the instant invention that the flipper diverter valve is not dependent on a return spring. Further, it is a feature of the instant invention that, due to the reduced weight of the assembly, the drain bucket of a washing machine in an exemplary embodiment need not be made of metal. Additionally, it is a feature of the instant invention to utilize a motor controller to control motor operation and flipper actuation. It is an additional feature of the instant invention to utilize a single input to the motor drive to minimize complexity and power utilization for the actuation of the apparatus, although separate inputs for the actuation of the motor drive, one for the drain and one for the recirculation actuated position, may also be utilized where appropriate or desired.

In view of the above-described problems existing in the art, and in accordance with the objects and features of the instant invention, the preferred embodiment of the instant invention includes a valve body preferably molded from a flame retardant talc filled polypropylene or other appropriate material. The body provides the internal valve geometry, flipper seal surfaces, shaft pivot points, recirculation hose connection, and inlet spin weld interface. Further, the body in accordance with a preferred embodiment of the instant invention provides the receptacle for the drive mechanism, locates and retains the circuit board and motor, and interfaces with the protective cover enclosing the motor and its control circuitry. The motor is preferably a standard leaded timer type motor that will operate preferably at approximately 4 rpm and deliver, in a preferred implementation, approximately 15 inch ounces of torque. In a preferred implementation the motor will have a square output shaft and will turn only in a given direction. The motor may be mounted by mounting ears to two stand off posts on the body which will locate the motor in relationship to the body.

A preferred embodiment of the instant invention will also utilize a cam that is preferably injection molded from a plastic type material. This cam may be pressed fit on the motor output shaft and has a center post that extends inside the motor output shaft to provide retention and lateral stability. An offset post on the face of the cam transmits the motor torque to the cam follower. The periphery of the cam has a notch that allows a microswitch lever to actuate when the mechanism is in each fill closed position. In this preferred embodiment, the follower will also be injected molded from a plastic type material and will include a slot that interfaces with and contains the cam follower at one end. The follower will also preferably include a double D feature at the other end that interfaces with and rotates the shaft. The follower is preferably sandwiched between the circuit board and the cam in this preferred embodiment. Also in this preferred embodiment the follower will contain a narrowed section that is designed to flex t absorb the over travel of the mechanism or allow motor travel to continue if an object becomes caught preventing movement of the flipper mechanism. The shaft driven by the follower will also preferably be injection molded from a plastic type material, and may be incorporated as a single piece with the follower itself. In either event, the shaft includes a groove molded to accept a quad ring type seal. The shaft also includes another double D feature molded in to interface and transmit motion to the flipper. The quad ring is assembled into the grove on the shaft and interfaces with the shaft and the shaft hole in the body to provide a watertight seal between the shaft and the body. The flipper body will also preferably be injected molded from a plastic type material and will be over molded with rubber to form a double-sided circular seal with a raised ring around each surface.

A further aspect of a preferred embodiment of the instant invention will include an inlet that is injection molded from the same material as the body, and will provide the connection for the hose that brings water into the valve. This inlet will preferably be spin welded onto the body, although other attachment methods may be utilized as appropriate. The cover will also preferably be injection molded from the same material as the body and the inlet. This cover interfaces with the body and protects the electrical components from splashed water. It preferably has latches that will retain it to the body and may include a vertical rib along the top of the cover over the electrical connector to channel water runoff away from the connector. The cover may also have vertical posts extending down to the top of the shaft, the top of the microswitches, and the top of the customer electrical connector to provide additional vertical stability.

The circuit board will preferably be a single sided printed circuit board assembly that includes microswitches mounted on the circuit board to provide the correct positioning for proper actuation via operation of the follower and cam. An electrical connector customized for a particular application is mounted to the board which positions it properly in relation to the access window provided in the body. All electrical inner connections are provided by the board with the exception of the wire leads that connect to the motor coil. A motor control circuit provides the logic necessary to allow the motor to be controlled by a single control line from the timer. In a preferred embodiment a 120-volt AC single on the control input sends the valve to the drain position. The absence of the signal on the control input sends the valve to the recirculation position. Alternatively, the motor may be controlled by separate control lines from the timer as desired or appropriate. This circuit board may be supported by standoffs mounted into the body, and will be horizontally located by the same posts to which the motor mounts.

In a preferred embodiment, a diverter valve in accordance with the teachings of the instant invention comprises a valve body having a fluid inlet and a first and a second fluid outlet, and a flipper body operably positioned within the valve body providing selectable sealing engagement with the first and the second fluid outlets. The valve further preferably includes a motor, a cam drivably coupled to the motor, and a cam follower operably coupled to the cam for translating motion to the flipper body to operably position the flipper body in sealing engagement with the first and the second fluid outlets. The cam follower may be one piece or may comprise an assembly of a follower body and a shaft.

In a further preferred embodiment, the motor includes an output shaft in driving engagement with the cam, and rotates the cam in a given direction. The cam follower is operably coupled to the cam such that the cam follower translates the rotational motion of the cam to reciprocal motion to drive the flipper body. Additionally, the cam preferably includes an offset post and the follower defines a slot therein for accommodating the offset post. This slot is configured to allow lateral translation of the offset post therein, and the lateral translation being transverse to the reciprocal motion. Preferably, the cam includes a center post extending inside the output shaft of the motor. In a highly preferred embodiment, the follower accommodates continued rotation of the cam after motion of the flipper body has ceased. This may be accomplished by the follower through the inclusion of a neck down region.

The diverter valve further preferably comprises a motor controller circuit operably connected to the motor to operate the motor to drive the flipper body between engagement with the first and the second fluid outlets. The motor controller circuit is in sensory communication with the cam to sense its position thereof, the sensed position of the cam utilized to deenergize the motor when the flipper body has engaged one of the first and the second fluid outlets. Preferably, the cam includes a notch in an outer periphery thereof, the motor controller circuit comprises at least one microswitch having an actuatable lever in communication with the outer periphery, and the position of the cam is sensed when the lever communicates with the notch indicating that the flipper body has engaged one of the first and the second fluid outlets. Preferably, the motor controller circuit comprises a second microswitch having an actuatable lever in communication with the outer periphery, and the position of the cam is sensed when the lever communicates with the notch. The microswitches are each positioned to indicate that the flipper body has engaged one of the first and the second fluid outlets.

In a further preferred embodiment of the instant invention, the motor controller comprises a first and a second controllable switch coupled in parallel with each other and in series with a first and a second position switch to provide energization to the motor to rotate the cam. The first and the second position switches are preferably in sensory communication with the cam to open at a given rotary position of the cam. The controllable switches are preferably TRIACs gated in response to an external command to transition the flipper body. Alternatively, the controllable switches may be separate normally open and normally closed contacts of a latching type control relay operated in response to external commands to transition the flipper body.

In an alternate embodiment of the instant invention, a drive circuit for a diverter valve having a valve body defining an inlet and a first and a second outlet, fluid flow being directed from the inlet to one of the first and the second outlets by a flipper body translatable between sealing engagement with the first and the second valve outlets, comprises a motor, a cam drivably coupled to the motor, and a cam follower operably coupled to the cam. The cam follower operates to convert rotary motion of the cam into reciprocal motion to drive the flipper body between sealing engagement with the first and the second valve outlets. The drive circuit preferably further comprises a motor control circuit operable in response to an external command to energize the motor to drive the flipper body between sealing engagement with the first and the second valve outlets. This motor control circuit is in sensory communication with the cam to deenergize the motor at a predetermined position of the cam.

In a further preferred embodiment, the cam defines a notch in its outer periphery. The motor control circuit includes at least one position sensing element in sensory communication with the outer periphery of the cam to indicate the predetermined position of the cam. Preferably, the motor continues to drive the cam to the predetermined position despite a lack of motion of the flipper body.

The motor control circuit preferably comprises at least one gateable switch in series with at least one switch controlled by the position sensing element to energize the motor until the predetermined position of the cam is reached. The motor control circuit further includes a second position sensing element in sensory communication with the outer periphery of the cam indicating a second predetermined position of the cam, and a second gateable switch in series with a second switch controlled by the second position sensing element. This second gateable switch and the second switch are coupled in parallel to the at least one gateable switch and the at least one switch. In this way, the motor control circuit is operable to energize the motor to rotate the cam from the predetermined position to the second predetermined position, and from the second predetermined position to the predetermined position.

In a further alternate embodiment, a valve comprises a body defining a first, a second, and a third orifice, a flipper operably positioned to substantially prohibit flow through one of the first, the second, and the third orifices, a flipper drive mechanism drivably coupled to the flipper. The flipper drive mechanism comprises a motor, a cam drivably coupled to the motor and including a cam position indicator, a follower drivably coupled to the cam translating rotational motion of the cam into reciprocal motion to drive the flipper, and a motor control circuit in sensory communication with the cam position indicator. The motor control circuit couples an external source of electrical power to the motor to energize the motor to drive the cam to a first and a second predetermined position. The motor control circuit includes a first gateable switch in series with a first controllable switch. This first controllable switch opens in response to the cam position indicator indicating that the cam is at the first predetermined position. The motor control circuit further includes a second gateable switch in series with a second controllable switch and in parallel to the first gateable switch and the first controllable switch. This second controllable switch opens in response to the cam position indicator indicating that the cam is at the second predetermined position.

Other objects and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
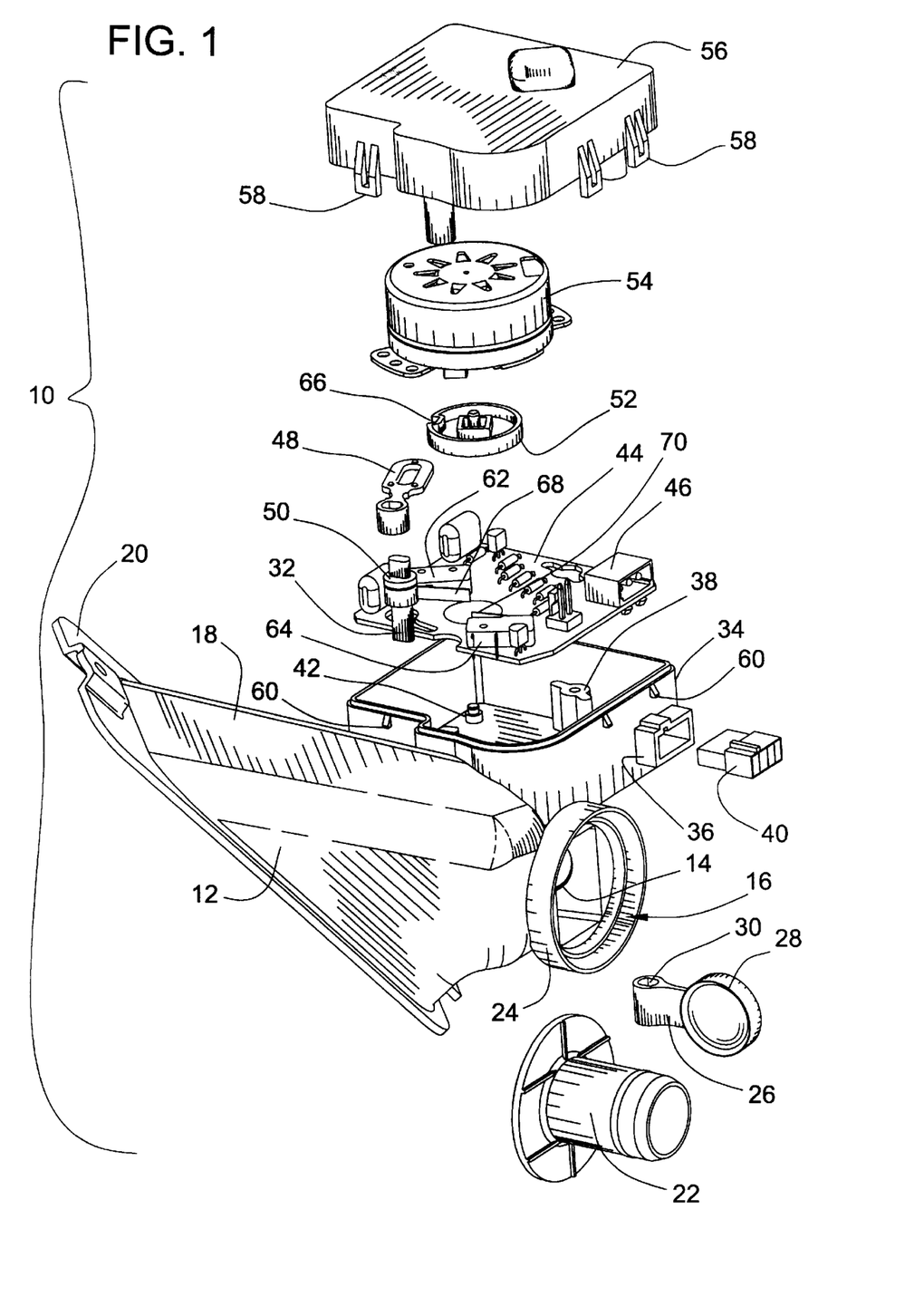
FIG. 1 is an exploded isometric view of a flipper valve assembly constructed in accordance with the teachings of the instant invention.

With an understanding of the prior designs and the problems existing therewith, direction is now focused on the drawings of the application, and in particular first to FIG. 1. It should be noted that the embodiments illustrated in the figures are presented by way of example, and not be way of limitation. As will become apparent to one skilled in the art from the following description, numerous modifications to the embodiments presented are available and within the scope of the instant invention. Therefore, explicit reservation of all such modifications within the scope of the appended claims is made. To aid in the understanding of the instant invention, like reference numerals will be used throughout the figures for like elements.

As may be seen from the exploded isometric view of FIG. 1, a flipper valve assembly 10 constructed in accordance with the teachings of the instant invention preferably includes a molded valve body 12 which defines therein the internal plumbing routing from the single inlet 16 to the recirculation outlet 14 and the discharge outlet (not shown). Additionally, the valve body 12 may also include a unitary molded drain bucket portion 18 which includes a mounting cowel 20 which will allow attachment of the body 12 to the feature panel of a conventional washing machine from the inside out. An inlet 22 provides connection for a hose that brings water into the valve inlet 16. This inlet 22 is preferably an injected molded part and will preferably be spin welded onto the body 12 within the molded inlet 24.

Prior to such attachment process of the inlet 22, a flipper body 26 is inserted within the valve body through inlet 16 to provide directional control of the water entering through inlet 22. The flipper body 26 is preferably injected molded from a plastic type material, although other materials may be utilized as appropriate. It is contemplated within the instant invention that the flipper valve mechanism of the instant invention may be utilized in applications other than consumer home appliances, in which case different materials may be required. In the instant embodiment, the flipper body 26 is preferably over molded with a rubber material to form a double side circular seal 28 having a raised ring around each surface. The flipper body 26 also includes a female shaft channel 30 designed to mate with the flipper valve drive shaft 32 once assembly. This mounting channel 30 preferably includes a double D configuration, although other mounting drive configurations may be utilized as desired.

In a preferred embodiment of the instant invention, the unitary molded body 12 also includes an electronics drive housing 34 integrated therewith. An electrical connector port 36, as well as the circuit board mounting posts 38 are also integrally molded therein. The electrical connector port 36 may be of a standard configuration, or of a configuration defined by customer requirements to accept an electrical connector 40 utilized for a particular application. In addition to the mounting posts 38, positioning stumps 42 hold the controller circuit board 44 in a proper position therein. This ensures that the customer electrical connector 40 may properly mount to the controller electrical connector 46 when inserted through the connector port 36. The housing 34 also includes a hole in the bottom thereof (not shown) to allow the flipper drive shaft 32 to mate with the flipper body 26 outside of housing 34 while also mating with the follower 48 within the housing 34. A liquid seal is provided by a quad ring 50 contained within a notch of drive shaft 32 to prevent water from entering housing 34.

Within housing 34 the flipper drive shaft 32 mates with cam follower 48 in a drivable relationship. This drivable relationship may be accommodated via a double D configuration, or other configurations known in the art. Additionally, the follower 48 and the flipper drive shaft 32 may be molded as a single part if desired. The follower 48 operates in conjunction with cam 52 which is driven by motor 54. In the exemplary implementation of a consumer home washing machine, the motor 54 may be of a standard timer type motor providing as little as 15 inch ounces of torque and turning at a rate of approximately 4 RPM. Different sizes and speed motors may be utilized based upon the requirements of the installation into which this flipper valve assembly is to be utilized.

The housing 34 preferably mates with an enclosure cover 56 which is preferably injection molded from the same material as the enclosure 34. This cover 56 interfaces with the enclosure 34 to protect the electrical components contained therein from splashed water. Preferably, the cover 56 includes latches 58 that will retain the cover 56 to the enclosure 34, mating with mounting ribs 60. While not specifically illustrated in this FIG. 1, the cover 56 may include a vertical rib along the top of the cover 56 to channel water runoff away from the connector 36. The cover may also include vertical posts (not shown) extending down to the top of shaft 32, the top of the microswitches 62, 64, and the top of the electrical connector 46 to provide additional vertical stability.

As may be appreciated by the exploded isometric view of FIG. 1, the cam 52 is positioned between microswitches 62, 64. The periphery of cam 52 includes a notch 66 that allows the lever 68, 70 of microswitches 62, 64, respectively, to actuate when the mechanism is in each fully closed position. That is to say, as motor 54 rotates cam 52, the notch 66 allows one of the levers 68, 70 of cams 62, 64 to drop into the notch 66 thereby actuating the microswitch for the control mechanism. The lever 68, 70 of the other microswitch is held in a non-actuate position by the outer periphery of cam 52. Alternatively, the cam may include a detent to actuate microswitches of a different configuration. The actual control circuitry will be described in greater detail below with reference to FIG. 7.

Figure 2:
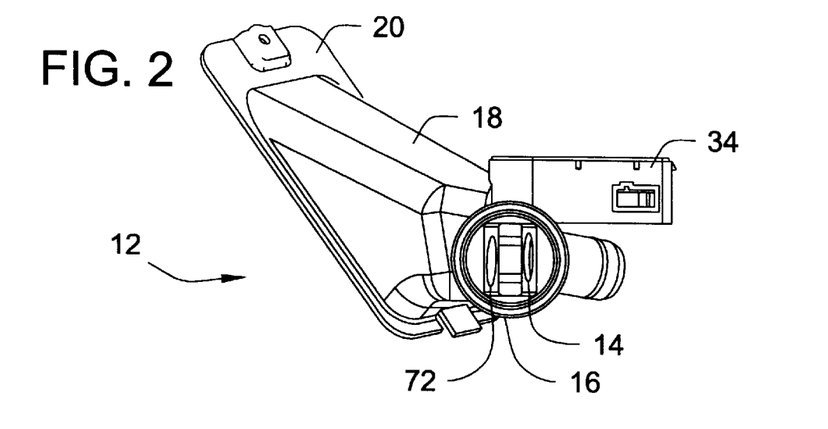
FIG. 2 illustrates details of the body of the flipper valve assembly of FIG. 1.

During operation of the valve of the instant invention, the motor 54 rotates cam 52 which translates follower 48 to drive shaft 32 to move flipper 26 between its two fully actuated positions. As illustrated in FIG. 2, the flipper 26 may block either the recirculation outlet 14 or the discharge outlet 72. When the flipper is actuated to block the discharge outlet 72, water entering through inlet 16 will be diverted to flow through the recirculation outlet 14. Likewise, when the flipper 26 is actuated to close off the recirculation outlet 14, water entering through inlet 16 is diverted to flow to the discharge outlet 72. In between each of these two fully actuated positions, both the recirculation outlet 14 and the discharge outlet 72 are open to water flow. However, system operation in the exemplary implementation of a consumer home washing machine is not particularly concerned with the momentary transition and dual output water flow between actuation positions. System operation may also be controlled to transition the flipper body 26 only during periods of no water flow into inlet 16. Additionally, this system may be operated with a motor 54 having a relatively high speed output so that the transition of the flipper body 26 from one actuated position to the other takes place within a very short time period. It is also contemplated that a third actuated position may be included, that position being midway between each of the other two actuated positions whereby both outlets 14 and 72 are fully open. This third position may be controlled by various methods, including the inclusion of a third and fourth microswitch (not shown) on the controller circuit board 44.

Figure 3:
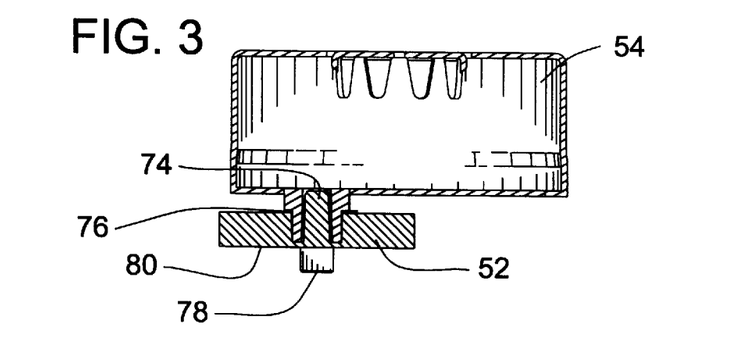
FIG. 3 illustrates a simplified cross sectional view of the motor cam interface of the assembly of FIG. 1.
Figure 4:
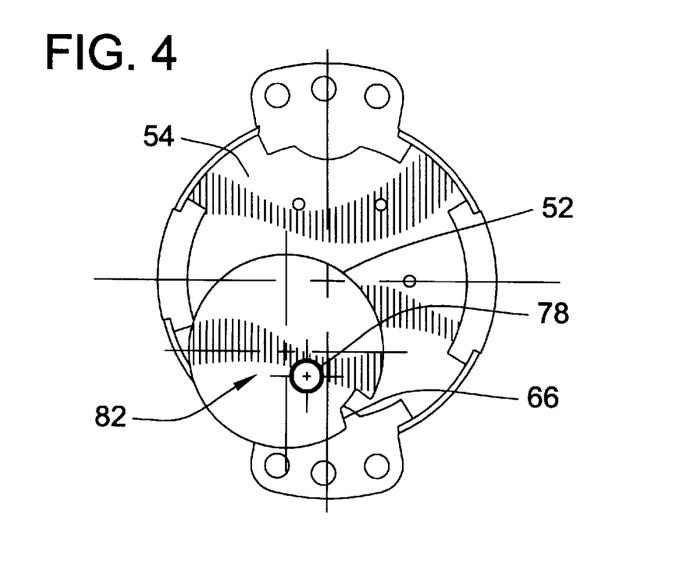
FIG. 4 illustrates a bottom view of the motor cam assembly of FIG. 3 illustrating additional aspects of the instant invention.

The driving interface between the cam 52 and the motor 54 is illustrated in cross-sectional view of FIG. 3. As may be seen from this cross-sectional view, the cam 52 includes a center post 74 that extends inside the motor output shaft 76 to provide retention and lateral stability thereof. Preferably, this interface is a press fit interface. The cam 52 also includes an offset post 78 on the face 80 of the cam 52 to transmit the motor torque to the cam follower 48 (see FIG. 1). While not necessarily apparent in this FIG. 3, FIG. 4 directly illustrates that the offset post 78 is indeed offset from the center 82 of cam 52. As also apparent from this FIG. 4, the notch 66 of cam 52 is placed in relationship to the offset post 78 so that the proper signaling from microswitches 62, 64 may indicate the fully actuated position of the flipper body 26 between outlet 14 and outlet 72. The positioning of this notch 66 in the outer periphery of cam 52 in relation to offset post 78 may be varied depending upon the placement of microswitches 62, 64 on the controller circuit board 44. As will also be apparent to one skilled in the art, notch 66 may be replaced with other cam features such as a detent depending upon the technology of the positioning switches 62, 64. All that is required by the instant invention is that the motor controller be provided some indication that the flipper 26 is in its fully actuated position so that the motor 54 may be deenergized.

Figure 5:
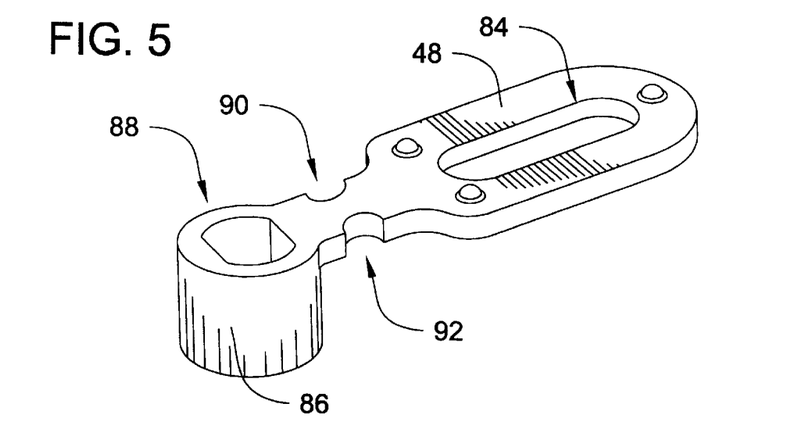
FIG. 5 illustrates an isometric view of the follower of the flipper valve assembly of FIG. 1.

The cam follower 48 preferably includes a follower slot 84 that interfaces with and contains the offset post 78. As the follower 48 moves with the rotation of cam 52, the motion of the cam is translated through the shaft mounting portion 86 of the follower 48. This shaft mounting portion 86 preferably mates with shaft 32 through a female double D configured channel 88, although other configurations of this mounting channel may be utilized as appropriate. Further, as indicated briefly above, the follower 48 and shaft 32 may be integrally molded as a single piece as desired and appropriate. The follower 48 also preferably includes notches 90, 92 to allow the follower 48 to flex to continue to track the cam motion should the flipper be prevented from further translation due to an object becoming stuck in the valve body. This flexure provided by notches 90, 92 allows the motor to continue to operate without becoming stalled to translate the cam to its fully actuated position. While only notches 90, 92 are illustrated, one skilled in the art will recognize that this flexure may also be accomplished through providing a neck down region for the follower 48. Other body configurations which provide follower flexure under these conditions are also included within the scope of the instant invention.

Figure 6:
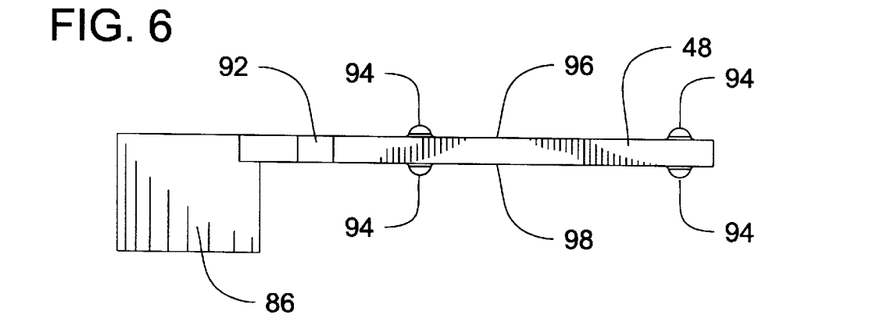
FIG. 6 illustrates a side view of the follower of FIG. 5 illustrating additional aspects thereof.

As may be seen from FIG. 6, the follower 48 also preferably includes bearing nipples 94 on both the top 96 and bottom 98 surfaces of the follower 48. These bearing nipples 94 are included in this exemplary embodiment to allow free translation of the follower 48 between the bottom surface 80 of cam 52 and the surface of the controller circuit board 44. These bearing nipples 94 provide minimum friction for the translation of follower 48 between these two surfaces. However, in an implementation where the follower 48 is in a spaced relationship between these two surfaces, these bearing nipples 94 may be dispensed with.

Figure 7:
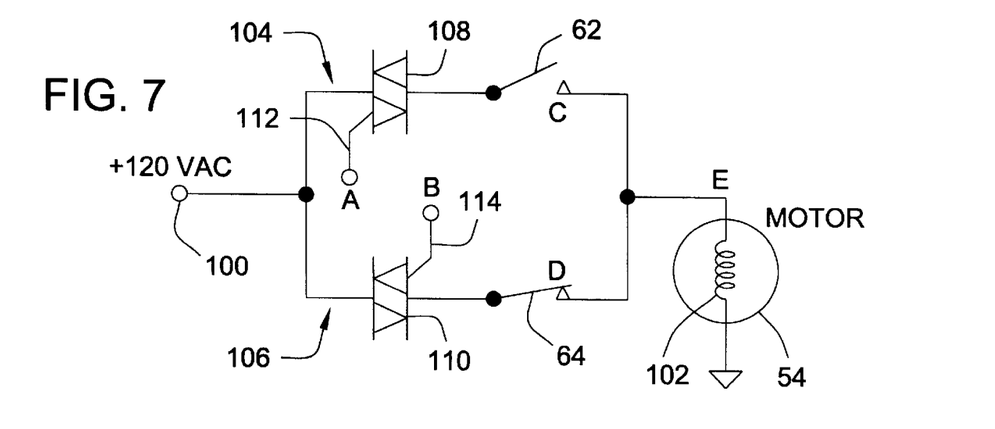
FIG. 7 illustrates a simplified electrical schematic of a control circuit of an embodiment of the instant invention.

An exemplary embodiment of a motor controller applicable to the valve assembly of the instant invention is illustrated in schematic form in FIG. 7, to which specific reference is now made. In this simplified schematic, a 120-volt AC input 100 is utilized to energize the coils 102 of motor 54 via one of two parallel paths 104, 106. In each of these parallel paths, 104, 106, a controllable switch, such as TRIAC 108, 110, is utilized in series with each of the microswitches 62, 64 mounted on the control board 44 (see FIG. 1). The TRIACs 108, 110 each contain a gate terminal 112, 114, which may be driven individually, or with the addition of an appropriate inverter or selection of TRIAC type, from a single control signal. If a single signal is used, the presence of the signal will gate one of the TRIACs, while the absence of the signal will gate the other. Alternatively, the controllable switches may be implemented through normally open and normally closed contacts of a single relay, or through separately controllable relays. Other embodiments of controllable switches will be apparent to those skilled in the art in view of this discussion and the following description of the exemplary operation of the motor control.

Figure 8:
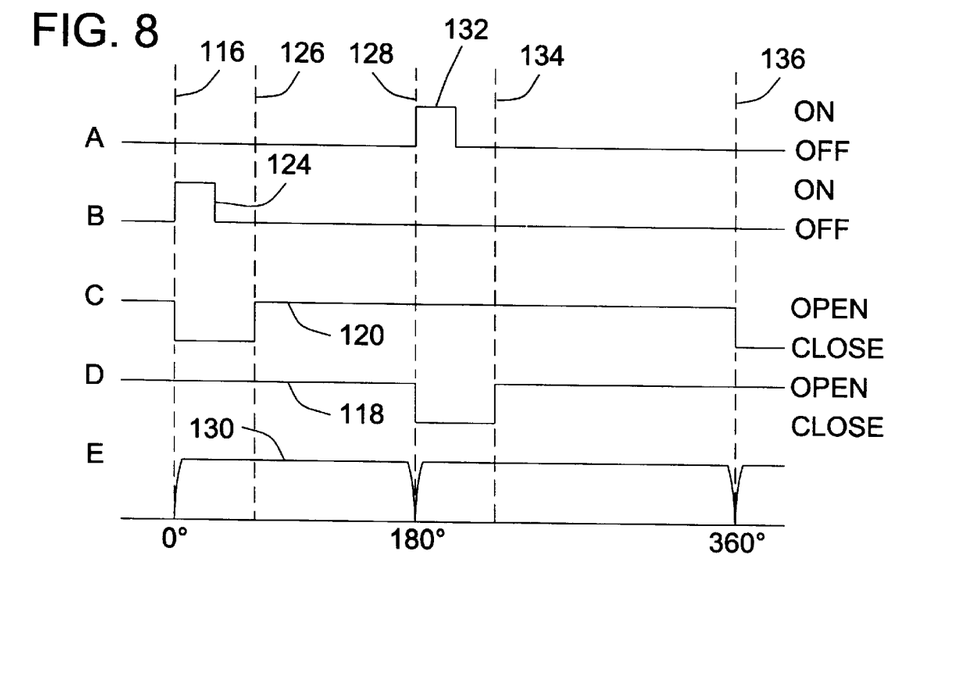
FIG. 8 is a system operation diagram illustrating system operation versus mechanical degrees.

The operation of a motor control circuit in accordance with the instant invention will now be described with relation to FIGS. 8 and 9. This discussion utilizes the simplified control circuit of FIG. 7 as an exemplary circuit, although one skilled in the art will recognize that such description is not dependent on the actual implementation of the motor control circuit. Specifically, FIG. 8 illustrates system operation in relation to mechanical angle of cam 52. At the zero degree point 116, one skilled in the art will note that microswitch D 64 (see FIG. 7) is in a closed position as indicated by trace 118, and microswitch C 62 is in an open position as indicated by trace 120. A gating signal B indicated by trace 124 is provided to TRIAC 110 to energize the motor windings 102 and begin rotation of cam 52. Alternatively, signal B could be a relay driver signal to close an open contact, etc. Further, this signal could be maintained (held on) during the period of time necessary to transition the flipper, depending on the technology of the controllable switch. As the cam is rotated, the notch 66 also rotates until the microswitch C 62 is closed by the outer periphery of the cam 52 at point 126. The actual angle at which this transition takes place is dependent upon the physical size of notch 66 of cam 52. As the cam continues to rotate, a point will be reached at which the notch 66 moves into position to actuate or open microswitch D 64. This point is illustrated in a preferred embodiment at the 180° point 128. As may be seen from trace 130, which indicates the motor winding energization, once the microswitch D has been opened at point 128 the motor energization 130 is removed. Once the motor has been de-energized, the rotation of the cam is stopped and the flipper is maintained in its fully actuated position.

At some point in time it may be desired to move the flipper body to its other actuated position. At this point a gate signal is applied to TRIAC 108 as indicated at point 128 of trace 132. Since the microswitch C 62 is closed, the motor coils 102 are again energized and the cam is rotated. At some point during this rotation, dependent upon the physical size of notch 66, microswitch D 64 will close as indicated at point 134. The cam continues to rotate until a point is reached where microswitch C again opens and the motor is again de-energized as indicated at point 136. As may be seen with this exemplary embodiment, the trigger points for these events 116, 128, and 136 are spaced 180 mechanical degrees one from the other.

Figure 9:
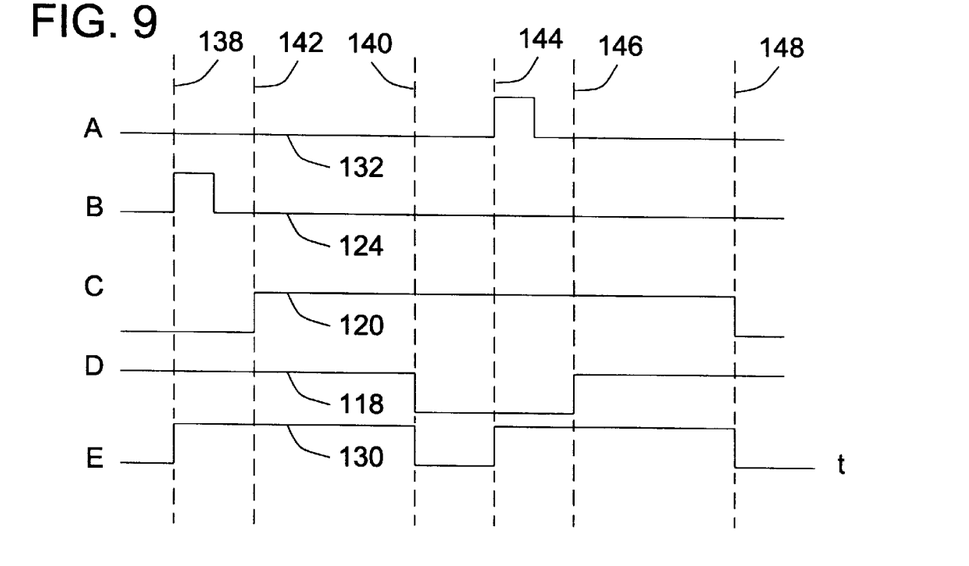
FIG. 9 is a system operation diagram illustrating operation of the system versus time.

Further appreciation of this operation may be had with reference to FIG. 9, which illustrates system operation versus time. As may be seem from this FIG. 9, the motor is de-energized as illustrated by trace 130 until time 138 at which point a gate signal 124 is applied to TRIAC 110. Current then flows through the TRIAC and closed microswitch D as indicated by trace 118 until time 140 when microswitch D opens. As will be recognized by one skilled in the art, at time 142 microswitch C closes as indicated by trace 120 as notch 66 of cam 52 rotates out of position for microswitch C 62. The amount of time between point 138 and point 142 is dependent upon the motor speed.

After the motor has been de-energized at time 140, it remains deenergized until a gate signal 132 is provided at time 144. Since microswitch C is already closed, the motor coils are again energized and the cam begins to rotate. At time 146, the notch 66 of cam 52 has rotated out of position in relation to microswitch D which allows this microswitch to again close. The rotation of the cam continues during motor energization until time 148. At this point the notch 66 of cam 52 has had sufficient time to rotate into position to allow microswitch C to open, thus de-energizing motor 54. The motor will stay de-energized, and the flipper body in its actuated position until a gate signal is again applied at terminal B 114 (see FIG. 7).

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure may be varied substantially without departing from the spirit of the invention, and exclusive use of all modifications that come within the scope of the appended claims is reserved.

What is claimed is:

1. A diverter valve, comprising:
   a valve body having a fluid inlet and a first and a second fluid outlet;
   a flipper body operably positioned within said valve body, said flipper body providing selectable sealing engagement with said first and said second fluid outlets;
   a motor;
   a cam drivably coupled to said motor;
   a cam follower operably coupled to said cam for translating motion to said flipper body to operably position said flipper body in sealing engagement with said first and said second fluid outlets; and
   wherein said cam follower comprises a two piece assembly of a follower body and a shaft.

2. A diverter valve, comprising:
   a valve body having a fluid inlet and a first and a second fluid outlet;
   a flipper body operably positioned within said valve body, said flipper body providing selectable sealing engagement with said first and said second fluid outlets;
   a motor;
   a cam drivably coupled to said motor;
   a cam follower operably coupled to said cam for translating motion to said flipper body to operably position said flipper body in sealing engagement with said first and said second fluid outlets; and
   wherein said motor includes an output shaft in driving engagement with said cam, and wherein said motor rotates said cam in a given direction, said cam follower operably coupled to said cam such that said cam follower translates rotational motion of said cam to reciprocal motion to drive said flipper body; and
   wherein said cam includes an offset post, and wherein said follower defines a slot therein for accommodating said offset post, said slot configured to allow lateral translation of said offset post therein, said lateral translation being transverse to said reciprocal motion.

3. A diverter valve, comprising:
   a valve body having a fluid inlet and a first and a second fluid outlet;
   a flipper body operably positioned within said valve body, said flipper body providing selectable sealing engagement with said first and said second fluid outlets;
   a motor;
   a cam drivably coupled to said motor;
   a cam follower operably coupled to said cam for translating motion to said flipper body to operably position said flipper body in sealing engagement with said first and said second fluid outlets; and
   wherein said follower accommodates continued rotation of said cam after motion of said flipper body has ceased; and
   wherein said follower includes a neck down region.

4. A diverter valve, comprising:
   a valve body having a fluid inlet and a first and a second fluid outlet;
   a flipper body operably positioned within said valve body, said flipper body providing selectable sealing engagement with said first and said second fluid outlets;
   a motor;
   a cam drivably coupled to said motor;
   a cam follower operably coupled to said cam for translating motion to said flipper body to operably position said flipper body in sealing engagement with said first and said second fluid outlets; and
   a motor controller circuit operably connected to said motor to operate said motor to drive said flipper body between engagement with said first and said second fluid outlets; and
   wherein said motor controller circuit is in sensory communication with said cam to sense a position thereof, said sensed position of said cam utilized to deenergize said motor when said flipper body has engaged one of said first and said second fluid outlets.

5. The diverter valve of claim 4, wherein said cam includes a notch in an outer periphery thereof, wherein said motor controller circuit comprises at least one microswitch having an actuatable lever in communication with said outer periphery, and wherein said position of said cam is sensed when said lever communicates with said notch indicating that said flipper body has engaged one of said first and said second fluid outlets.

6. The diverter valve of claim 5, wherein said motor controller circuit comprises a second microswitch having an actuatable lever in communication with said outer periphery, and wherein said position of said cam is sensed when said lever communicates with said notch, said microswitches each positioned to indicate that said flipper body has engaged one of said first and said second fluid outlets.

7. A diverter valve, comprising:
   a valve body having a fluid inlet and a first and a second fluid outlet;
   a flipper body operably positioned within said valve body, said flipper body providing selectable sealing engagement with said first and said second fluid outlets;
   a motor;
   a cam drivably coupled to said motor;
   a cam follower operably coupled to said cam for translating motion to said flipper body to operably position said flipper body in sealing engagement with said first and said second fluid outlets; and
   a motor controller circuit operably connected to said motor to operate said motor to drive said flipper body between engagement with said first and said second fluid outlets; and
   wherein said motor controller comprises a first and a second controllable switch coupled in parallel with each other and in series with a first and a second position switch to provide energization to said motor to rotate said cam, said first and said second position switches being in sensory communication with said cam to open at a given rotary position of said cam.

8. A drive circuit for a diverter valve having a valve body defining an inlet and a first and a second outlet, fluid flow being directed from the inlet to one of the first and the second outlets by a flipper body translatable between sealing engagement with the first and the second valve outlets, the circuit comprising:
   a motor;
   a cam drivably coupled to said motor;
   a cam follower operably coupled to said cam, said cam follower operating to convert rotary motion of said cam into reciprocal motion to drive the flipper body between sealing engagement with the first and the second valve outlets; and
   a motor control circuit operable in response to an external command to energize said motor to drive the flipper body between sealing engagement with the first and the second valve outlets, said motor control circuit being in sensory communication with said cam to deenergize said motor at a predetermined position of said cam.

9. The drive circuit of claim 8, wherein said cam defines a notch in an outer periphery thereof, wherein said motor control circuit includes at least one position sensing element in sensory communication with said outer periphery of said cam, said position sensing element indicating said predetermined position of said cam.

10. The drive circuit of claim 9, wherein said motor continues to drive said cam to said predetermined position despite a lack of motion of the flipper body.

11. The drive circuit of claim 9, wherein said motor control circuit comprises at least one controllable switch in series with at least one switch controlled by said position sensing element to energize said motor until said predetermined position of said cam is reached.

12. The drive circuit of claim 11, wherein said motor control circuit further includes a second position sensing element in sensory communication with said outer periphery of said cam, said second position sensing element indicating of a second predetermined position of said cam, and a second controllable switch in series with a second switch controlled by said second position sensing element, said second controllable switch and said second switch coupled in parallel to said at least one controllable switch and said at least one switch, said motor control circuit operable to energize said motor to rotate said cam from said predetermined position to said second predetermined position, and from said second predetermined position to said predetermined position.

13. A valve, comprising:
   a body defining a first, a second, and a third orifice;
   a flipper operably positioned to substantially prohibit flow through one of said first, said second, and said third orifices;
   a flipper drive mechanism drivably coupled to said flipper, comprising;
   a motor,
   a cam drivably coupled to said motor, said cam including a cam position indicator,
   a follower drivably coupled to said cam, said follower translating rotational motion of said cam into reciprocal motion to drive said flipper, and
   a motor control circuit in sensory communication with said cam position indicator, said motor control circuit coupling an external source of electrical power to said motor to energize said motor to drive said cam to a first and a second predetermined position, said motor control circuit including;
      a first controllable switch in series with a first position switch, said first position switch opening in response to said cam position indicator indicating that said cam is at said first predetermined position, and
      a second controllable switch in series with a second position switch and in parallel to said first controllable switch and said first position switch, said second position switch opening in response to said cam position indicator indicating that said cam is at said second predetermined position.

14. The valve of claim 13, wherein said first controllable switch and said second controllable switch are relay contacts.

* * * * *

UNITED STATES PATENT AND TRADEMARK OFFICE
CERTIFICATE OF CORRECTION

PATENT NO. : 6,206,043 B1
DATED : March 27, 2001
INVENTOR(S) : Jay P. Griswold, Robert A. Livernash, and Wesley S. Swanson It is certified that error appears in the above-identified patent and that said Letters Patent is hereby corrected as shown below:

<u>Title page,</u>
Item [75], the inventor's name should read -- Wesley S. Swanson --

Signed and Sealed this

Sixteenth Day of October, 2001

Attest:

*Attesting Officer*

NICHOLAS P. GODICI
*Acting Director of the United States Patent and Trademark Office*